US005801545A

United States Patent [19]
Takekoshi et al.

[11] Patent Number: 5,801,545
[45] Date of Patent: Sep. 1, 1998

[54] LCD TESTING APPARATUS

[75] Inventors: Kiyoshi Takekoshi; Tetsuji Ono, both of Yamanashi; Hiromichi Fujihara, Kofu, all of Japan

[73] Assignee: Tokyo Electron Limited, Tokyo, Japan

[21] Appl. No.: 679,115

[22] Filed: Jul. 12, 1996

[30] Foreign Application Priority Data

Jul. 14, 1995 [JP] Japan .................. 7-201401
Jul. 14, 1995 [JP] Japan .................. 7-201402
Jul. 14, 1995 [JP] Japan .................. 7-201403

[51] Int. Cl.$^6$ .................................. G01R 31/00
[52] U.S. Cl. .................................. 324/770
[58] Field of Search .................. 324/770, 158.1; 414/416, 222, 937

[56] References Cited

U.S. PATENT DOCUMENTS

| | | | |
|---|---|---|---|
| 4,827,212 | 5/1989 | Kamieniecki | 324/158.1 |
| 5,003,254 | 3/1991 | Hunt et al. | 324/158.1 |
| 5,479,108 | 12/1995 | Cheng | 324/765 |
| 5,506,498 | 4/1996 | Anderson et al. | 324/158.1 |

FOREIGN PATENT DOCUMENTS

| | | |
|---|---|---|
| 62-146591 | 9/1987 | Japan . |
| 3-117836 | 12/1991 | Japan . |
| 6-85739 | 12/1994 | Japan . |

OTHER PUBLICATIONS

The Proceedings of the 1995 Japanese Spring Conference foe the Technology of Plasticity, (pp. 71–72), May 18–20, 1995.

Primary Examiner—Ernest F. Karlsen
Assistant Examiner—Anh Phung
Attorney, Agent, or Firm—Oblon, Spivak, McClelland, Maier & Neustadt, P.C.

[57] ABSTRACT

An LCD assembly testing apparatus having a table for supporting the LCD assembly and for applying light to the back of the LCD assembly, and a transport mechanism for removing the LCD assembly from a cassette and transporting the LCD assembly onto the table. The transport mechanism has an arm for holding the LCD assembly, a first lift mechanism for vertical moving the arm, and a pre-alignment mechanism for receiving the LCD assembly and preliminary aligning the LCD assembly with the table. The pre-alignment mechanism has a plurality of support rollers for supporting the LCD assembly in a substantially horizontal position, four pairs of positioning rollers having axes intersecting at substantially right angles and located at level higher than the support rollers, for allowing the LCD assembly to fall naturally onto the support rollers and for holding corners of the LCD assembly, and a second lift mechanism for moving upwards the positioning rollers and the support rollers as the first lift mechanism moves the arm downwards.

13 Claims, 8 Drawing Sheets

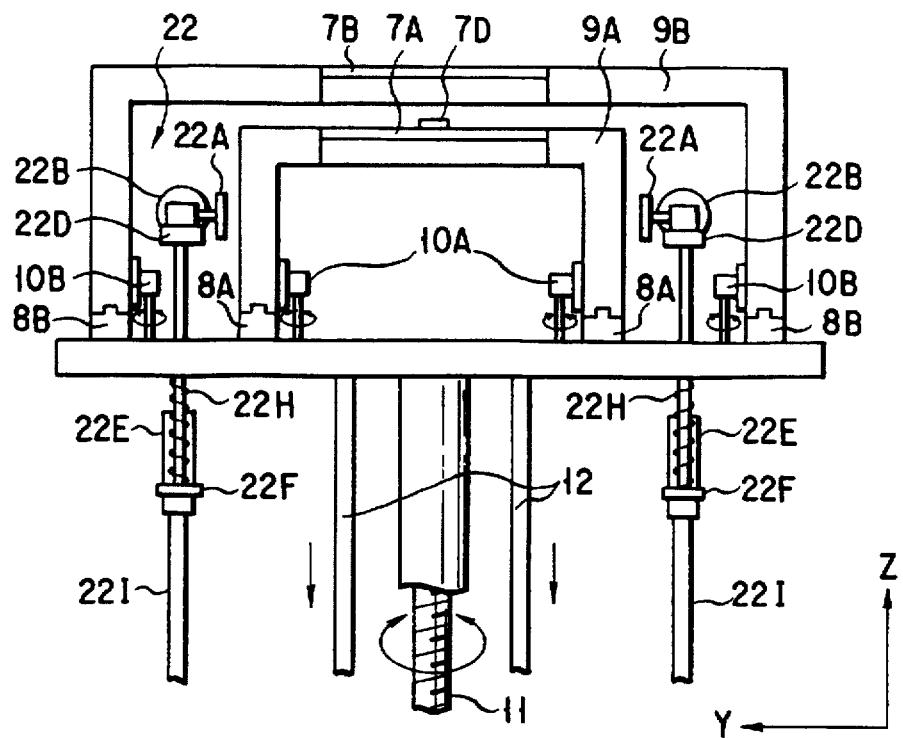
F I G. 3
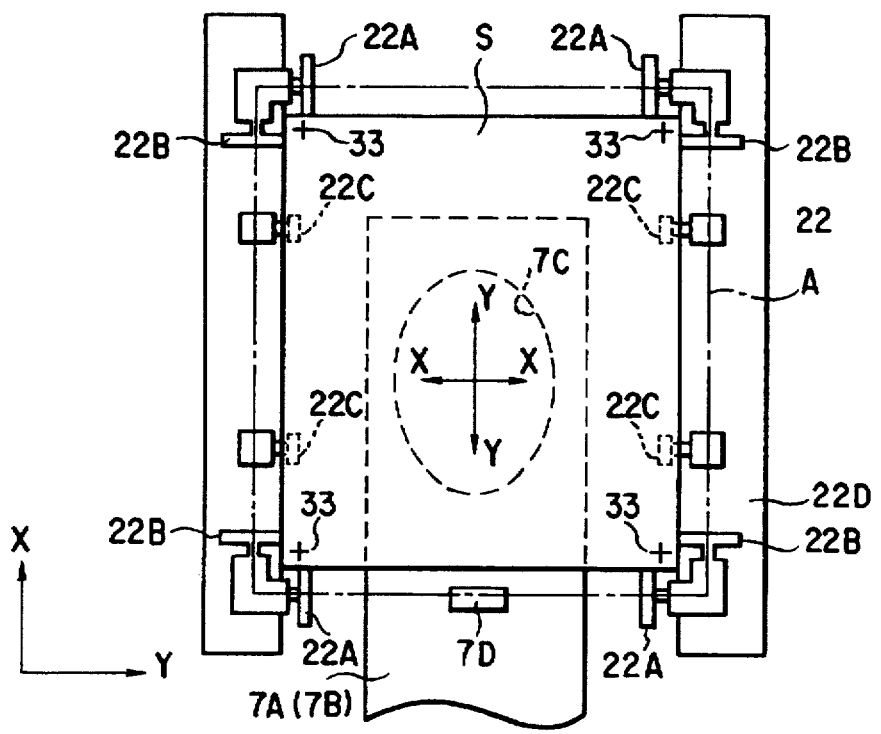
F I G. 4

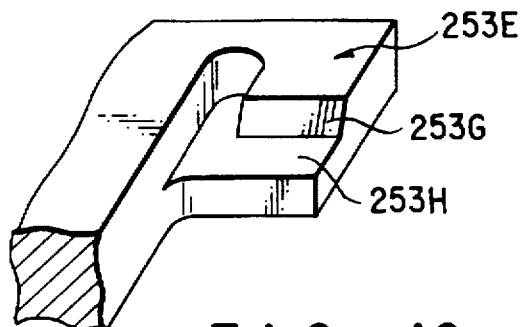
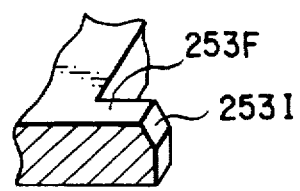
FIG. 10    FIG. 11
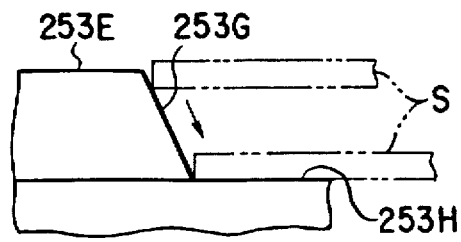
FIG. 12
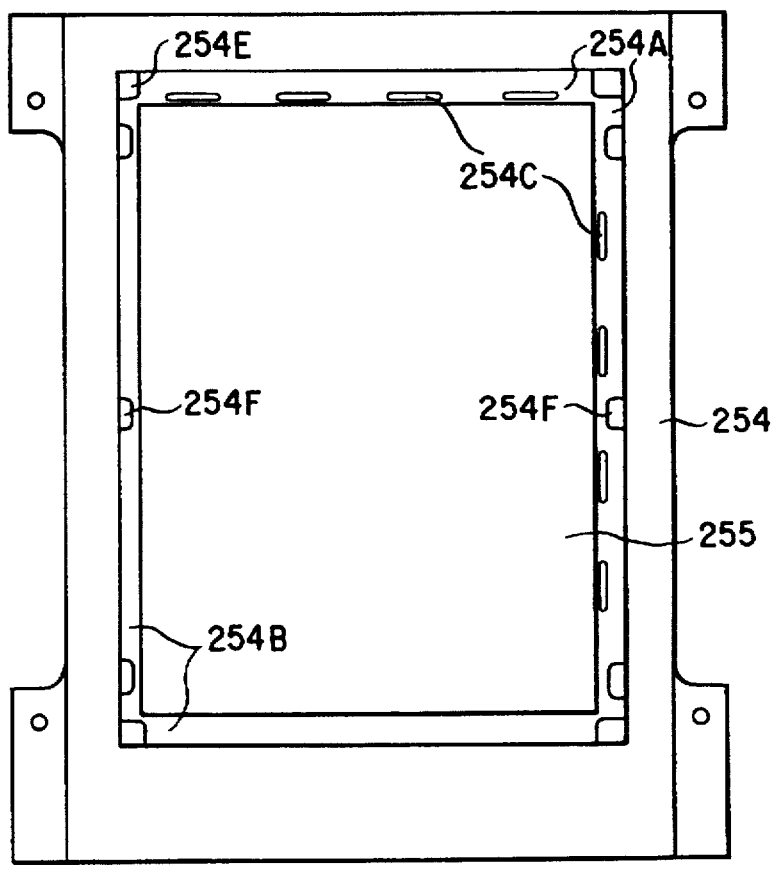
FIG. 13

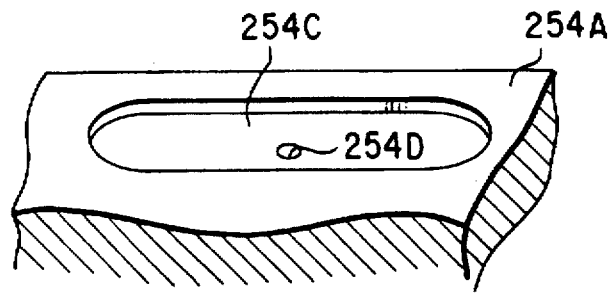 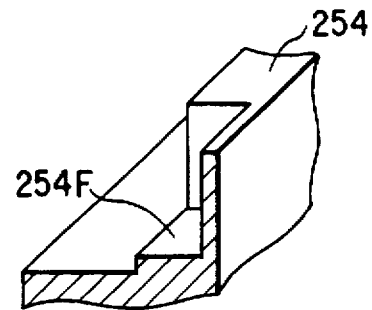
FIG. 14  FIG. 15
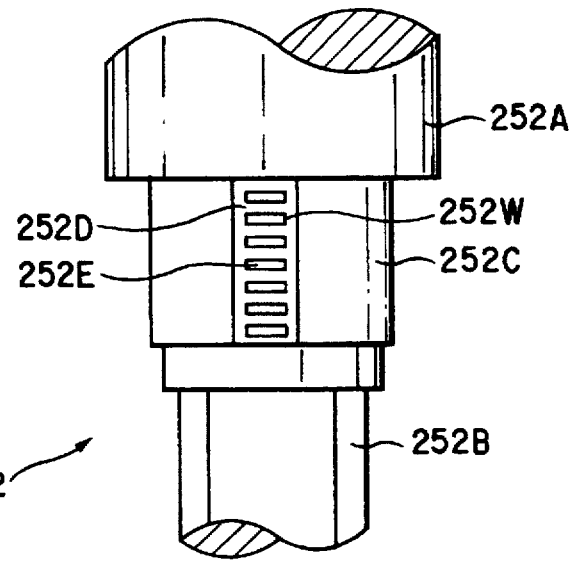
FIG. 16
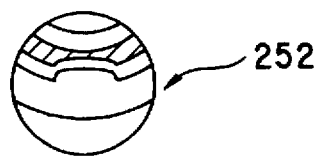
FIG. 17

LCD TESTING APPARATUS

BACKGROUND OF THE INVENTION

1. Field of the Invention

The present invention relates to an apparatus for testing a liquid crystal display (LCD) by applying light to the back of the LCD assembly, thereby to determine whether the LCD assembly performs its function or not.

2. Discussion of the Background

On the inner surface of one of two glass substrates of an LCD of, for example, thin-film transistor (TFT) type, electric circuits are arranged in rows and columns for turning on and off the pixels. The electric circuits are connected to pads (electrodes). The pads are arranged along the neighboring long and short side of the glass substrate. The gap between the glass substrates is filled with liquid crystal. The glass substrates, the electric circuit and the liquid crystal constitute an LCD assembly. To test the LCD assembly, the assembly is placed on a table, light is applied to the back of the assembly, probes are connected to the pads, and test signals are supplied from a tester through the probes and the pads to the electric circuits, whereby the LCD assembly displays a pattern such as a chessboard pattern. The pads must be positioned at the probes. To position the pads correctly, alignment marks are attached to the corner area of the LCD assembly.

The conventional LCD testing apparatus comprises a prober section and a loader section. The prober section has a table and a probe board. The loader section has a transport mechanism. The table is provided for holding an LCD assembly transported by the transport mechanism of the loader section. The prober board has a number of probes. The table can be moved in X-, Y- and Z-axis directions and can be rotated around the Z axis. After receiving an LCD assembly from the transport mechanism, the table is moved downwards to a position below the probe board, thereby electrically connecting the pads of the LCD assembly to the respective probes of the probe board.

The table incorporates a light-applying device for applying light to the back of the LCD assembly mounted on the table. While the device is applying light to the back of the LCD assembly, the table is moved upwards by means of a ball-screw mechanism including a guide mechanism. The guide mechanism guides the table, maintaining the upper surface of the table in a horizontal plane. The guide mechanism is of the type disclosed in pages 71–72 of "The Proceedings of the 1995 Japanese Spring Conference for the Technology of Plasticity,".

The guide mechanism comprises a cylinder which is coupled to the table and which is moves up and down, remaining in point contact with a ball bearing. The guide mechanism is not rigid enough to move a large LCD assembly together with the table. Recently, LCD assemblies are manufactured in an increasing size. Hence, the guide mechanism provided by the ball-screw mechanism lacks rigidity. When a large LCD assembly is placed on the table, an excessive load may be applied on the guide mechanism, which is deformed. Consequently, the LCD assembly is displaced with respect to the probe board. The pads of the LCD assembly are no longer aligned with the probes of the probe board, and the accuracy of testing the LCD assembly inevitably decreases. To avoid this, the guide mechanism may be made larger and thus more rigid. If the guide mechanism is made larger and rigid, however, its manufacturing cost will rise.

The table of the conventional LCD testing apparatus incorporates three or four support pins. The support pins are raised, protruding from the upper surface of the table. An LCD assembly is transferred onto the upper ends of the support pins. The support pins are lowered back into the table, placing the LCD assembly on the upper surface of the table. Then, the LCD assembly is held on the table by vacuum suction means. The LCD assembly is not stable while mounted on the upper ends of the support pins. It may be displaced while being lowered onto the table as the support pins are lowered back into the table.

The conventional LCD testing apparatus is disadvantageous in another respect. The LCD assembly is pre-aligned in the transport mechanism of the loader section. If the LCD assembly is pre-aligned incorrectly, it will not be mounted on the table at a correct position. As a consequence, it takes a long time to find the alignment marks and the LCD assembly cannot be aligned at all if the assembly moves out of the view field of a CCD camera.

SUMMARY OF THE INVENTION

The object of the present invention is to provide an LCD testing apparatus which can be manufactured at low cost and which can accurately position a large LCD assembly and test the LCD assembly for its function.

An LCD testing apparatus according to the invention is designed to apply light to the back of an LCD assembly and supply test signals to the electric circuits incorporated in the LCD assembly while the probes remain electrically contacting the pads provided on the LCD assembly, thereby to determine whether the LCD assembly properly performs or not. The apparatus comprises; a table for supporting the LCD assembly and for applying light to the back of the LCD assembly; and a transport mechanism for taking the LCD assembly out from a cassette and transporting the LCD assembly onto the table. The transport mechanism has an arm for holding the LCD assembly, a first lift mechanism for vertically moving the arm and a pre-alignment mechanism for receiving the LCD assembly and preliminarily aligning the LCD assembly with the table. The pre-alignment mechanism has a plurality of support rollers for supporting the LCD assembly in a substantially horizontal position, four pairs of positioning rollers, and a second lift mechanism. The positioning rollers have axes intersecting at substantially right angles and located at level higher than the support rollers. They allow the LCD assembly to fall by its own weight onto the support rollers and hold the corners of the LCD assembly. The second lift mechanism moves the positioning rollers and support rollers upwards as the first lift mechanism moves the arm downwards.

The table has a transfer mechanism which can move vertically to transfer the LCD assembly between the table and the transport mechanism, and a holder mechanism which is designed to receive and hold the LCD assembly transferred by the transfer mechanism. The transfer mechanism has a support section for contacting neighboring two sides of the LCD assembly and a guide section for contacting at least two diagonally opposite corners of the LCD assembly and guiding the LCD assembly onto the support section.

The table further comprises a mount assembly for supporting the LCD assembly, a lift mechanism attached to a lower surface of the mount assembly, for vertically moving the amount assembly, and at least three guide mechanisms surrounding the lift mechanism and spaced therefrom at the same distance, for guiding the mount assembly being moved by the lift mechanism. Each of the guide mechanisms has a hollow cylinder, a rod inserted in the hollow cylinder, and plural needle bearings interposed between the hollow cylinder and the rod and set in linear contact with the hollow cylinder and the rod, and a retainer which holds the needle bearings.

In the LCD testing apparatus of this invention, an LCD assembly can be correctly positioned on the table even if it is displaced from the correct position when transferred to the table by the transport mechanism.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 3 is a front view of the transport mechanism, as seen in the direction in which an LCD assembly is transported;

FIG. 4 is a plan view of the transport device incorporated in the apparatus;

FIG. 10 is a perspective view of one of the corner guide portions of the assembly-holding member;

FIG. 11 is a perspective view showing the middle guide portion of the assembly-holding member;

FIG. 12 is a side view explaining how the corner guide portion of each assembly-holding member guides the LCD assembly;

FIG. 13 is a plan view of the holder mechanism provided on the table;

FIG. 14 is an enlarged perspective view of a part of the holder mechanism;

FIG. 15 is another enlarged perspective view of the part of the holder mechanism;

FIG. 16 is an enlarged view of the guide post of the lift mechanism incorporated in the table;

FIG. 17 is a cross-sectional view of the guide post;

DETAILED DESCRIPTION OF THE PREFERRED EMBODIMENTS

Preferred embodiments of the present invention will be described, with reference to the accompanying drawings.

Figure 1:
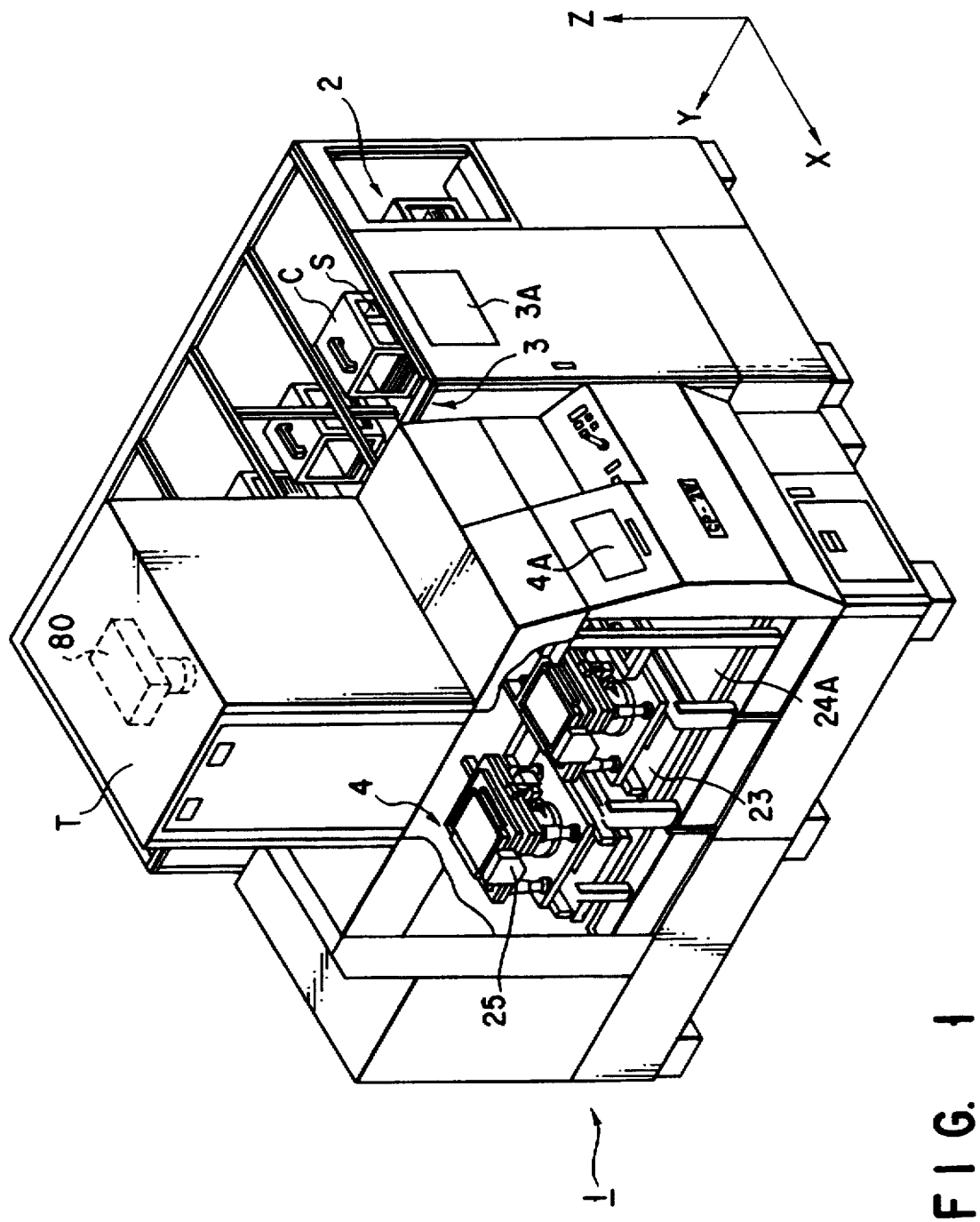
FIG. 1 is a cutaway perspective view of an LCD testing apparatus according to the present invention.

FIG. 1 shows an LCD testing apparatus 1 according to the invention. As shown in FIG. 1, the apparatus 1 comprises a cassette-holding section 2, an assembly-transporting section 3 and a testing section 4. The cassette-holding section 2 contains 4–8 cassettes C, which are labeled with ID marks. Each cassette C contains twenty-five LCD assemblies S. Each LCD assembly S comprises two parallel glass substrates and a layer of liquid crystal interposed between the glass substrate. Each assembly S has an ID mark and alignment marks 33 (FIG. 4).

The assembly-transporting section 3 has a transport mechanism 6. The mechanism 6 transports the LCD assemblies S from the cassettes C into the testing section 4 and transports them from the testing section 4 back into the cassettes C after the assemblies S have been tested. The testing section 4 has two tables 25 and a probe card. Each table 25 incorporates a back light for illuminating the back of the LCD assembly S placed on the table 25. The probe card has a number of probes which extend vertically.

Two CCD cameras (not shown) are provided for each table 25, one located above the table 25 and the other below the table 25. Thus, the LCD testing apparatus has four CCD cameras in all. The CCD cameras scan the probes and the pads of the LCD assembly S being tested, serving to align the pads with the probes. They are of the type disclosed in International Patent Application PCT/JP96/00699 (international filing date: Mar. 18, 1996).

A tester T is provided above the testing section 4. The tester incorporates a fifth camera 80 and a CPU. The fifth camera 80 is a high-resolution camera which has, for example, five million pixels. The fifth camera 80 scans the LCD assembly S illustrated, generating image data representing the assembly S. The image data is supplied to the CPU of the tester and analyzed thereby.

As seen from FIG. 1, the assembly-transporting section 3 has a touch panel 3A. The operator operates the touch panel 3A to input data required for testing the LCD assembly S. Also displayed by the display 4A is the image of the other LCD assembly (not being tested) placed on the second table 25, and the operator can know whether the other LCD assembly is correctly aligned with the probes or not.

Various sensors (not shown) are attached to each cassette-holding section 2, for detecting entry of anything other than LCD assemblies S and reading the ID marks provided on the LCD assemblies S. The sensors are connected to the input of a controller (not shown). The controller generates instructions from the detection signals supplied from the sensors. The instructions are supplied to the transport mechanism 6 of the assembly-transporting section 3 and to a cassette-transporting cart (not shown).

Figure 2:
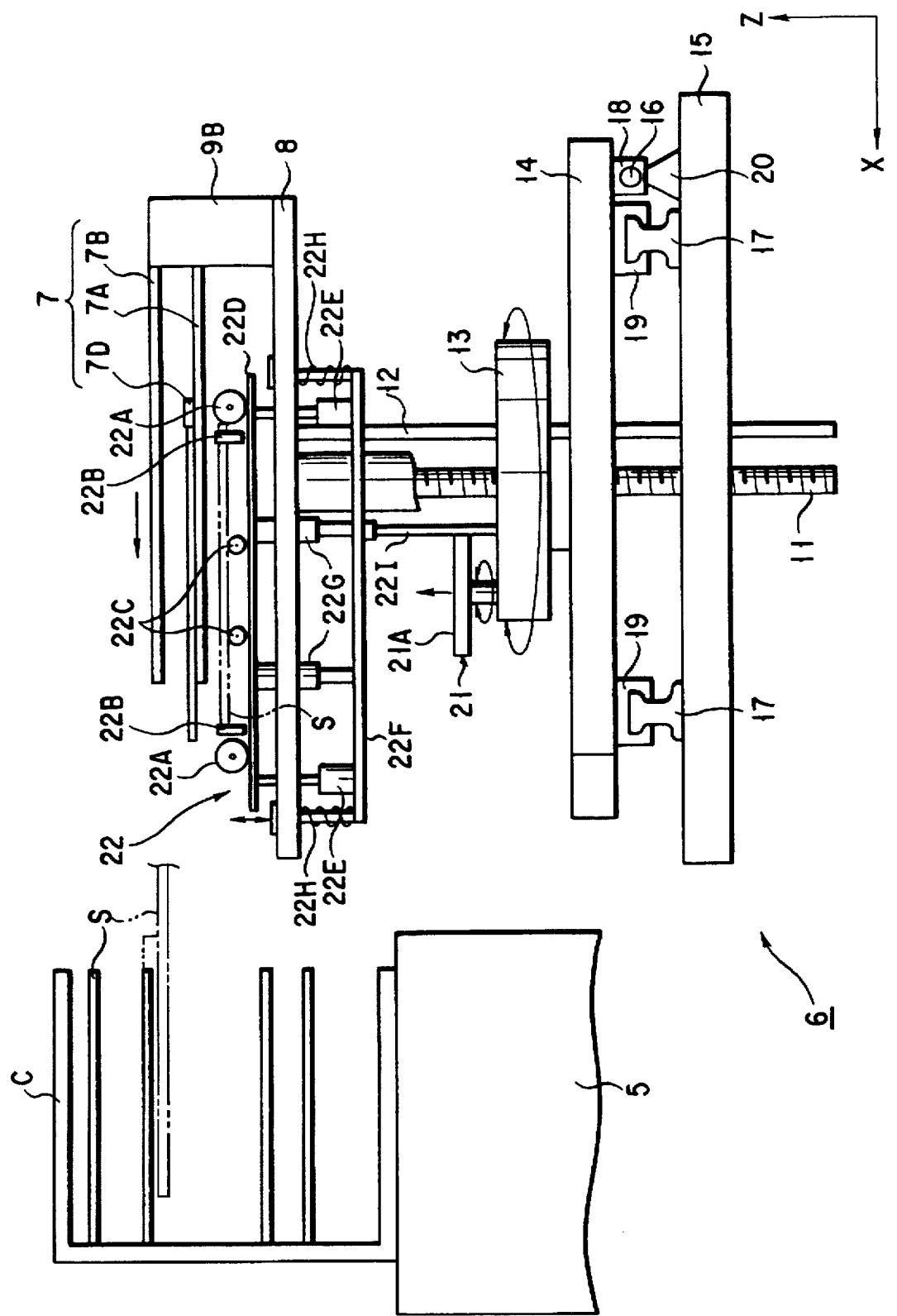
FIG. 2 is a side view showing the transport mechanism and the cassette, both incorporated in the apparatus.

The transport mechanism 6 will be described, with reference to FIGS. 2 to 4. The transport mechanism 6 is provided in a space between the cassette-holding section 2 and the testing section 4. As shown in FIG. 2, the mechanism 6 comprises an arm section 7 and a drive section. The drive section can move the arm section 7 X-, Y- and Z-axis directions and rotate the arm section 7 around the Z axis. The arm section 7 comprises two arms 7A and 7B and a support plate 8. The arms 7A and 7B extend horizontally, the arm 7A located below the arm 7B.

As shown in FIG. 3, a pair of guide rails 8A and a pair of guide rails 8B are laid on the support plate 8, extending parallel in the X-axis direction. The guide rails 8A extend between the guide rails 8B. The arm 7A of the arm section 7 is coupled to a support member 9A, which is mounted on the guide rails 8A. Similarly, the arm 7B of the arm section 7 is coupled to a support member 9B, which is mounted on the guide rails 8B. Both support members 9A and 9B are shaped like an inverted U. The lower portions of the support member 9A are fastened to an endless belt 10A, and the lower portions of the support member 9B to an endless belt 10B. The endless belt 10A is wrapped around a driving pulley (not shown) and a driven pulley (not shown). The endless belt 10B is wrapped around a driving pulley (not shown) and a driven pulley (not shown). The driving pulleys are connected to the shafts of two electric motors (not shown), respectively. Therefore, the loader arm 7A is driven by a drive mechanism, while the upper arm 7B is driven by another drive mechanism.

The loader arm 7A is a loader arm for moving each LCD assembly S out of any cassette C to the testing section 4. On the other hand, the upper arm 7B is an unloader arm for moving the LCD assembly S from the testing section 4 into the cassette C. The loader arm 7A has suction holes (not shown) in the upper surface. So does the upper arm 7B. The suction holes of the arms 7A and 7B communicate with a vacuum pump (not shown). Thus, both arms 7A and 7B can attract and hold the LCD assembly S.

The lower surface of the support plate 8 is coupled to the upper end of a ball screw 11. The lower end of the ball screw 11 is connected to a decelerator (not shown), which is connected to the shaft of an electric motor (not shown, either). Extending from the lower surface of the plate 8 are three vertical rails 12. The vertical rails 12 extend parallel to the ball screw 11, surrounding the ball screw 11.

As shown in FIG. 2, the vertical rails 12 pass through the holes made in a rotary member 13, and the ball screw 11 is set in screw engagement with a nut (not shown) secured to the rotary member 13. Hence, the support plate 8 is lifted upwards when the ball screw 11 is rotated in the forward direction, and is lowered when the ball screw 11 is rotated in the reverse direction.

The rotary member 13 is located above a Y table 14. Provided below the Y table 14 is a base 15. A ball screw 16 and a pair of guide rails 17 are provided on the upper surface of the base 15 as is illustrated in FIG. 2. The ball screw 16 and the guide rails 17 cooperate to reciprocate the Y table 14 in the Y-axis direction. The ball screw 16 is arranged outside one of the guide rails 17. A nut 18 is mounted on the ball screw 16 and set in screw engagement therewith. The nut 18 is secured to the lower surface of the Y table 14. Provided on the lower surface of the Y table 14 are two engagement members 19. The members 19 are set in engagement with the guide rails 17, respectively. The ball screw 16 is connected at one end to the shaft of an electric motor 20. When the motor 20 rotates the ball screw 16 in one direction or the other, the Y table 14 is moved back and forth in the Y-axis direction, along the cassette-holding section 2.

As seen from FIG. 2, the transport mechanism 6 further comprises an assembly-orienting mechanism 21 and a pre-alignment mechanism 22.

The loader arm 7A and the upper arm 7B have a through hole 7C each, as is shown in FIG. 4. The holes 7C are large enough to allow the table 21A of the assembly-orienting mechanism 21. The rotary member 13 is connected by a belt (not shown) to an electric motor (not shown, either). When the electric motor rotates the member 13 around the Z axis, both arms 7A and 7B are rotated.

The assembly-orienting mechanism 21 is provided on a portion of the rotary member 13, which is near the circumference thereof. The mechanism 21 comprises a table 21A and a lift (not shown). The lift has an air cylinder or the like. The table 21A can be rotated independently of the rotary member 13. The table 21A has a suction hole (not shown). A negative pressure is applied through this suction hole, thereby to attract a LCD assembly S to the table 21A. Thus, the assembly-orienting mechanism 21 can orient the LCD assembly S to any desired direction, whenever necessary.

The pre-alignment mechanism 22 will be described, with reference to FIGS. 2 to 6.

The pre-alignment mechanism 22 is designed to align the center of an LCD assembly S with that of the table 21A before the assembly-orienting mechanism 21 orients the LCD assembly S. As is best shown in FIG. 4, the mechanism 22 comprises four positioning rollers 22A, four positioning rollers 22B, four support rollers 22C, two flat bars 22D, and four air cylinders 22E.

Figure 5:
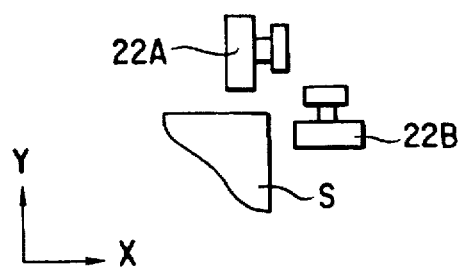
FIG. 5 is a plan view of the positioning rollers provided near a corner of the LCD assembly.

As shown in FIGS. 4 and 5, the positioning rollers 22A are located to contact the four corners of the LCD assembly S, respectively. So are the positioning rollers 22B. Each positioning roller 22A is arranged to contact, at its circumferential surface, a short side of the LCD assembly S. Each positioning roller 22B is arranged to contact, at its circumferential surface, a long side of the assembly S. The axis of each positioning roller 22A extends at right angles to the axis of the positioning roller 22B which is located at the same corner of the LCD assembly S. The positioning rollers 22A and 22B are rotatably supported by the flat bars 22D.

The support rollers 22C are located below the long-side portions of the LCD assembly S, to contact the lower surface thereof. The support rollers 22C are rotatably supported by the flat bars 22D. If the LCD assembly S is fairly large, additional support rollers may be arranged below the short-side portions of the LCD assembly S.

The positioning rollers 22A and 22B can be moved by means of a position-adjusting mechanism (not shown), in accordance with the size of the LCD assembly S. The circumferential surface regions of the positioning rollers 22A and 22B are made of ceramic, resin, metal or rubber which would neither damage the glass substrate of the LCD assembly S nor give off particles.

The air cylinders 22E which constitute a second lift have a rod each. The rods of two of the air cylinders 22E are coupled to the lower surfaces of one of the flat bars 22D. The rods of the remaining two air cylinders 22E are coupled to the lower surface of the other flat bar 22D. The four air cylinders 22E can pull the flat bars 22D downwards, thereby lowering the rollers 22A, 22B and 22C, and can and push the flat bars 22D upwards, thus lifting the rollers 22A, 22B and 22C.

As illustrated in FIG. 3, two of the air cylinders 22E are fixed on a frame 22F, while the remaining two air cylinders 22E are fixed on another frame 22F. Both frames 22F are provided below the support plate 8. A plurality of guide members 22G are provided between the flat bars 22D on the one hand and the frames 22F on the other hand, not interfering the support plate 8. Coil springs 22H are provided between each frame 22F and the support plate 8, biasing the frame 22F downwards. The air cylinders 22E can push the flat bars 22D upwards to lift the positioning rollers 22A and 22B and the support rollers 22C, whereas the springs 22H can pull down the flat bars 22D and, hence, the rollers 22A, 22B and 22C.

A plurality of stoppers 22I protrude upwards from the rotary member 13. They are located right below the frames 22F to abut on the lower surface of the frames 22F. Upon abutting on the frames 22F, the stoppers 22I prevent the frames 22F from moving downwards further.

Figure 6:
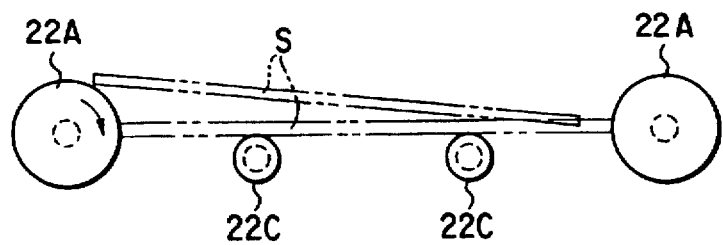
FIG. 6 is a diagram explaining how the positioning rollers position the LCD assembly.

As can be understood from FIG. 6, the positioning rollers 22A and 22B of the pre-alignment mechanism 22 rotate when the LCD assembly S is mounted on these rollers 22A and 22B. Then, the LCD assembly S falls onto the support rollers 22C. The LCD assembly S is thereby pre-aligned, held horizontally by the support rollers 22C and having its four corners positioned by the positioning rollers 22A and 22B. The axes of the positioning rollers 22A and 22B are at substantially the same level as the LCD assembly S thus pre-aligned.

In order to position the LCD assembly S by the pre-alignment mechanism 22, it is necessary to move the assembly S from the loader arm 7A (i.e., loader arm) to a limited rectangular region A indicated by a dot-dashed line in FIG. 4. To this end, a positioning member 7D shown in FIG. 4 is positioned at the border of the rectangular region A. The member 7D abuts on the front of the LCD assembly S which partly projects from the cassette, moving and positioning the LCD assembly S within the rectangular region A. Thus, the positioning member 7D adjusts the position of the LCD assembly S takes with respect to the X-axis direction, preventing the LCD assembly S from moving out of the rectangular region A. The LCD assembly S is not displaced in the Y-axis direction, because it is prevented from moving in this direction by the cassette C.

Both tables 25 of the testing section 4 are made of, for example, aluminum. The surface region of each table 25 has been changed to black alumite by means of anodization. Hence, the tables 25 hardly reflect the light applied to them.

The tables 25 and the mechanism for driving the tables 25 will be described, with reference to FIGS. 7 to 19.

Figure 7:
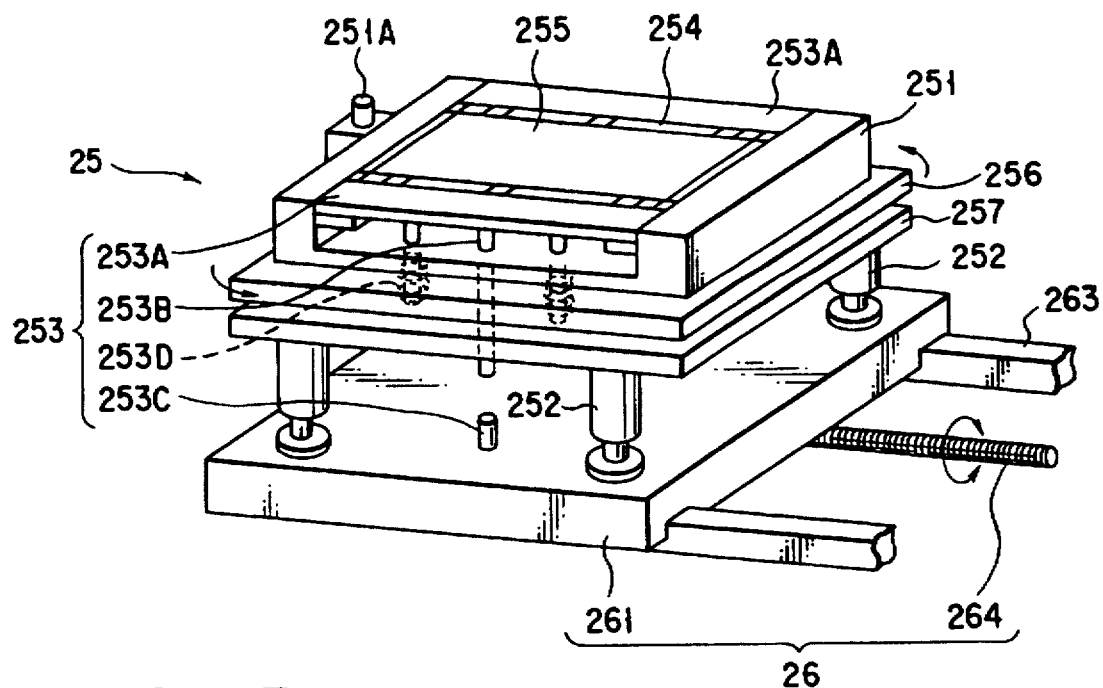
FIG. 7 is a perspective view of one of two identical tables incorporated in the LCD testing assembly.

As shown in FIG. 7, each table 25 comprises a mount assembly 251, a lift mechanism (not shown) and four guide posts 252. The table 25 is a rectangular box as a whole. It can be moved back and forth in both the X-axis direction and the Y-axis direction, by means of a drive mechanism 26. The table 25 can support an LCD assembly S. The lift mechanism (not shown) has a vertical ball screw, an electric motor and the guide posts 252. The guide posts 252 extend downwards from the four corners of the mount assembly 251, for guiding the mount assembly 251 in the Z-axis direction.

The mount assembly 251 comprises a transfer mechanism 253, a holder mechanism 254, and a light-applying device 255. The transfer mechanism 253 can move up and down to transfer an LCD assembly S between the loader arm 7A and the upper arm 7B. The holder mechanism 254 is provided in the transfer mechanism 253, for holding an LCD assembly S in a region where the assembly S can be illuminated. The light-applying device 255 is a plane-emission type for use in notebook-size personal computers. The device 255 is equipped with a fluorescent back light (not shown), a beam-rotating means, and a light-dispersing plate (not shown). The beam-rotating means receives the light beams from the back light and rotate the beams by about 90°. The light-dispersing plate is a frosted glass plate or the like and disperses light uniformly from its entire surface.

As shown in FIG. 7, a CCD camera 251A is attached to the mount assembly 251, for monitoring probes. The image of the probes, formed by the CCD camera 251A, is displayed on a monitor screen 4A. Seeing the image, the operator can know the positional relation between the needles and the pads.

The transfer mechanism 253 will be described in detail, with reference to FIGS. 7 to 9. The transfer mechanism 253 comprises a pair of positioning frames 253A, a rod 253B, a stopper 253C, and guide rods 253D. The positioning frames 253A contact in part the long sides of the LCD assembly S, positioning and supporting the same. The rod 253B extends downwards from the lower surface of the positioning frames 253A and passes through the holes made in a rotating table 256 and the holes made in a support plate 257. The stopper 253C protrudes upwards from an X-table 261, located right below the rod 253B. The guide rods 253D extend downwards from the positioning frames 253A. They are arranged such that the rod 253B is located between them. The rod 253B comes to contact the stopper 253C when the table 25 is lowered a predetermined distance. Once the rod 253B contacts the stopper 253C, the table 25 can no longer be lowered and hence remains spaced apart from the X-table 261.

The positioning frames 253A are identical in structure. Thus, only one of them will be described in detail, with reference to FIGS. 8 to 12.

Figures 8, 9:
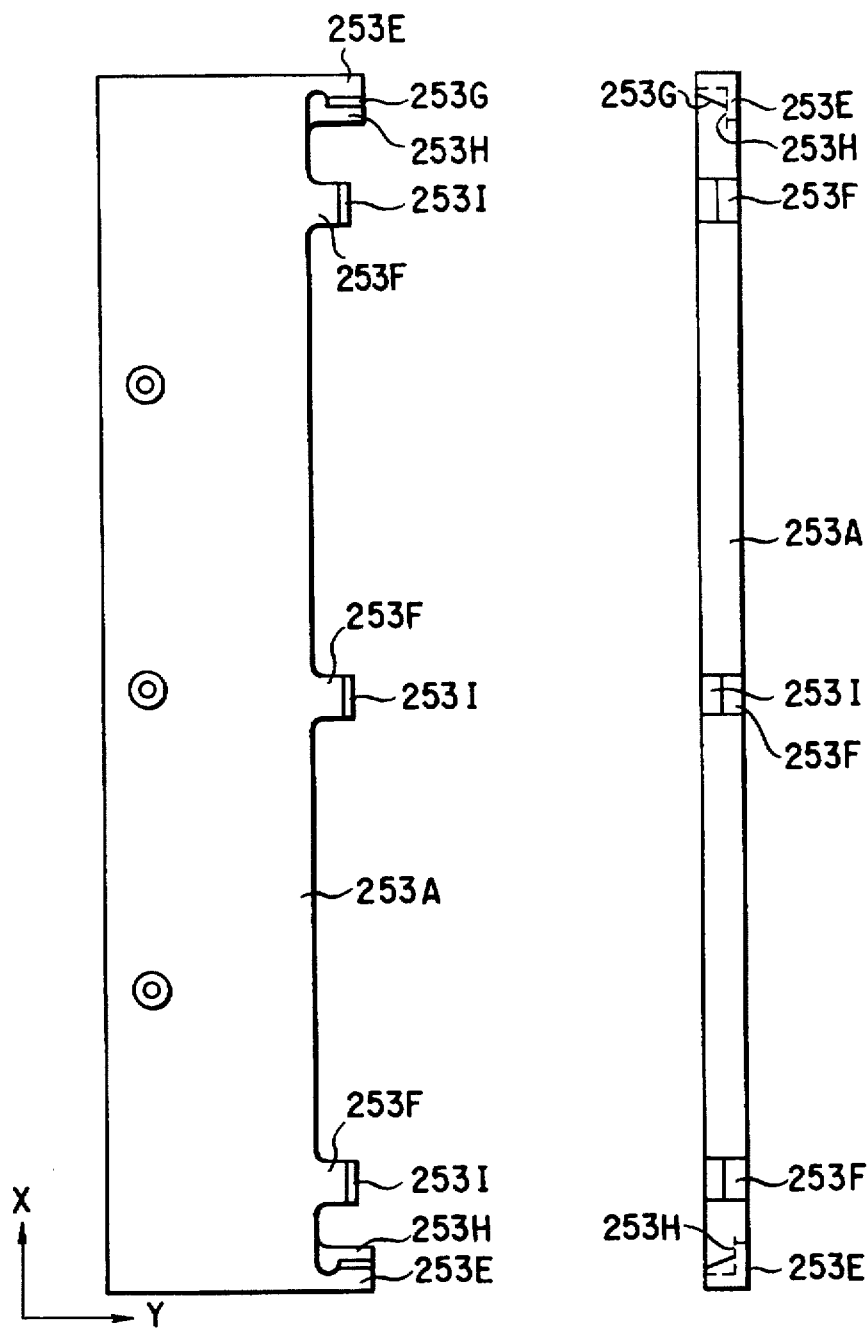
FIG. 8 is a plan view showing one of the two assembly-holding members which are provided on the table.
FIG. 9 is a side view of the assembly-holding member shown in FIG. 8.

As seen from FIGS. 8 and 9, two projections 253E protrude from the inner side of the positioning frame 253A, at the front and rear ends thereof. Similarly, three projections 253F protrude from the inner side of the positioning frame 253A, located between the projections 253E. These projections 253E and 253F cooperate to position an LCD assembly S on the holder mechanism 254.

As shown in FIGS. 8 and 10, each projection 253E has a guide portion 253G and a support portion 253H. The guide portion 253G has a tapered surface extending in the X-axis direction. The support portion 253H has a horizontal surface. As seen from FIG. 12, the guide portion 253G guides one corner of the LCD assembly S as the assembly S falls, and the support portion 253H receives and supports the corner of the assembly S.

As illustrated in FIGS. 8 and 11, the projections 253F has a guide portion 253I each. The guide portion 253I has a tapered surface which extends in the Y-axis direction. The guide portion 253G guides one corner of the LCD assembly S as the assembly S falls after the assembly S is transferred onto the positioning frame 253A.

The guide portions 253G and 253I of the transfer mechanism 253 contacts the LCD assembly S pre-aligned at the transport mechanism 6, thus positioning the LCD assembly S. The LCD assembly S thus positioned is transferred to the holder mechanism 254 as the transfer mechanism 253 moves upwards.

As shown in FIG. 13, the holder mechanism 254 is a rectangular frame. It is designed to hold, at its inner edges, an LCD assembly S. The holder mechanism 254 has a first support portion 254A and a second support portion 254B, The first support portion 254A is an L-shaped member for supporting two neighboring edge portions of the LCD assembly S on which pads P are arranged. The first support portion 254A is composed of two bars connected together at one end and extending at right angles to each other. The second support portion 254B is also an L-shaped member, for supporting the remaining two neighboring edge portions of the LCD assembly S on which no pads are arranged. The second support portion 254B is composed of two bars connected together at one end and extending at right angles to each other. These bars are less broad than the bars constituting the first support portion 254A.

As shown in FIG. 13, the first support portion 254A has elongated recesses 254C which are arranged at regular intervals. As shown in FIG. 14, the portion 254A has exhaust holes 254D which open at the bottoms of the elongated recesses 254C. The recesses 254C and the holes 254D serve to attract the LCD assembly S to the holder mechanism 254 as will be explained later. The second support portion 254B has neither recesses nor exhaust holes.

As seen from FIGS. 13 and 15, the holder mechanism 254 has grooves 254E and grooves 254F. Fitted in the grooves 254E are the projections 253E of the positioning frame 253A. Fitted in the grooves 254F are the projections 253F of the positioning frame 253A. The grooves 254E and 254F are deep enough to conceal the projections 253E and 253F completely.

The guide posts 252 for guiding the mount assembly 251 moving upwards or downwards will be described, with reference to FIGS. 16 to 19.

As shown in FIG. 16, each of the guide post 252 comprises a cylindrical member 252A, a rod 252B, and a cylindrical retainer 252C. The cylindrical member 252A is fixed to the lower surface of the mount assembly 251 at its upper end (not shown). The rod 252B is inserted into the cylindrical member 252A, with its lower end secured to the X-table 261. The retainer 252C is placed between the cylindrical member 252A and the rod 252B. The member 252C has needle bearings 252E on its outer circumferential surface. Three, six, eight or twelve guide grooves 252D are cut in the outer circumferential surface of the retainer 252C, extending vertically. The guide grooves 252D are spaced apart by equal angular distance (120°), along the circumference of the retainer 252C. Needle bearings 252E are provided in each guide groove 252D. The needle bearings 252E extend horizontally and are juxtaposed in vertical direction. Each needle bearing 252E is rotatably held in a window 252W, having two circumferential surface portions protruding from the outer and inner circumferential surfaces of the retainer 252C.

Figure 18:
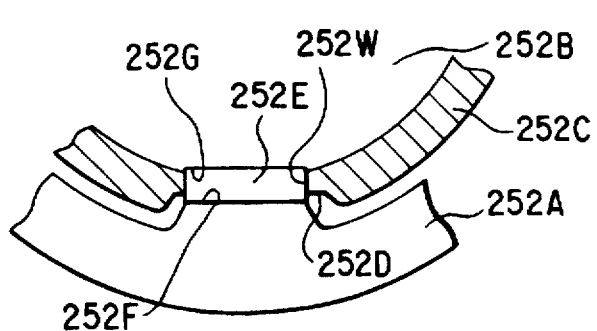
FIG. 18 is a still enlarged, cross-sectional view of the guide post.
Figure 19:
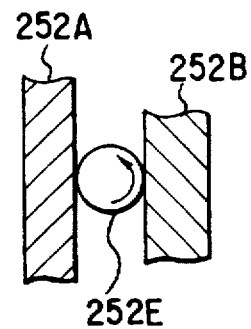
FIG. 19 is an even more enlarged, cross-sectional view of the guide post, for explaining the operation of the guide post.

As shown in FIGS. 17 to 19, three flat projections 252F are provided on the inner circumferential surface of the cylindrical member 252A. Each needle bearing 252E is set in line-contact with one flat projection 252F. Three flat projections 252G are provided on the outer circumferential surface of the rod 252B. Each needle bearing 252E is set in line-contact with one projection 252G. When the cylindrical member 252A moves vertically as the mount assembly 251 moves vertically, the retainer 252C also vertically moves by half the stroke of the cylindrical member 252A. As mentioned above, the cylindrical member 252A and the rod 252B set in line-contact with the large number of needle bearings 252E at the projections 252F and 232F. Therefore, the LCD testing apparatus is rigid enough to rigidity overcome an offset load, unlike the conventional apparatus. The displacement of the pads on the LCD assembly S from the probes can thereby be reduced. Thus, the LCD assembly S can be positioned with high accuracy.

It will be explained how the LCD testing apparatus test the LCD assembly S.

First, the substrate transfer mechanism 6 is moved to the front of the cassette C. At the same time, the arm section 7 is rotated, orienting the top of the arm section 7 to the cassette C. The arm section 7 is moved vertically until the loader arm 7A reaches a level at which a target LCD assembly S is located. The loader arm 7A is moved forward, partly into the cassette C. If the LCD assembly S protruding from the cassette C, the positioning member 7D abuts on the assembly S, pushing the same into the cassette C. The LCD assembly S is thereby positioned correctly. Then, the loader arm 7A is moved up. The LCD assembly S is eventually attracted to the loader arm 7A. The endless belt 10A is driven in reverse direction, moving the loader arm 7A from the cassette C. The LCD assembly S is thereby removed from the cassette C.

The rotation member 13 is rotated, rotating the loader arm 7 through 180°. The top of the loader arm 7 is oriented to the testing section 4.

When the loader arm 7A reaches the upper portion of the pre-alignment mechanism 22, the ball screw 11 is driven, moving the loader arm 7A downwards. At the same time, the rollers 22A, 22B, and 22C are moved up by the the air cylinder 22. Since the stoppers 22I contacts the frame members 22F, the pre-alignment mechanism 22 is lifted, against the force of the springs. The loader arm 7A fast approaches the positioning rollers 22A, 22B, and 22C, because the pre-alignment mechanism 22 is being lifted and the rollers 22A, 22B, 22C are being lifted by the air cylinder 22E. The LCD assembly S is released from the loader arm 7A.

When the positioning rollers 22A and 22B come to contact the lower surface of the LCD assembly S, the positioning rollers 22A and 22B rotate, moving the LCD assembly S onto the support rollers 22C. The LCD assembly S is left on the support rollers 22C as it is. The loader arm 7A passes through a space between the pair of the flat bars 22D, leaving the LCD assembly S is left on the support rollers 22C. Then, the loader arm 7A stops at a position slightly below the flat bars 22D.

The operation of the pre-alignment mechanism 22 will be explained below.

The displacement of the LCD assembly S is substantially eliminated before the LCD assembly S is transferred from the loader arm 7A to the pre-alignment mechanism 22. Hence, the LCD assembly S is placed in the rectangular region A of the pre-alignment mechanism 22. As shown in FIG. 6, when the positioning rollers 22A and 22B contact the lower surface of the LCD assembly S, the positioning rollers 22A and 22B rotate, allowing the LCD assembly S to fall onto the support rollers 22C. Since the circumferential surfaces of the rollers 22A, 22B, and 22C are soft, the glass substrates of the assembly S are not damaged. No particles are generated from the glass substrates even if the substrates are scratched.

When the LCD assembly S is mounted on the support roller 22C, its four corners are held by the positioning rollers 22A and 22B. As a result, the LCD assembly S is held at a desired position of the receiving area A.

After the LCD assembly S is thus positioned, the ball screw 11 and the air cylinders 22E are simultaneously driven. The loader arm 7A is thereby moved up until the support rollers 22C receive the LCD assembly S. The LCD assembly S is completely pre-aligned in the substrate transfer mechanism 6. Then, the loader arm 7A is moved to the testing section 4, driven by the drive of the ball screw 11 and the endless belt 10A. The loader arm 7A is set at a level at which the LCD assembly S is transferred to the table 25 provided in the alignment area 24A (FIG. 1).

When the ball screw 264 (FIG. 7) is rotated, together with the operation of the loader arm 7A, the table 25 is moved in both the X-axis direction and the Y-axis direction. The table 25 reaches the position where the LCD assembly S is to be transferred. Thus, the LCD assembly S can now be transported by the transport mechanism 6 and the table 25.

It will be explained how the LCD assembly S is mounted in the testing section 4.

In the table 25 located at the mounting position, the rod 253B of the delivery mechanism 253 contacts the stopper 253C when the ball screw 264 of a lift mechanism (not shown) is rotated, moving the mount assembly 251 downwards. If the mount assembly 251 is further moved down, the positioning frames 253A are located above the holder mechanism 254, providing a space formed between the frames 253A and the holder mechanism 254. At this time, the loader arm 7A is placed a little above the frames 253A. Then, the endless belt 10A of the loader arm 7A is rotated, and the loader arm 7 is moved to upper portion. The LCD assembly S is positioned above the holder mechanism 254 and the light-applying device 255. Since the LCD assembly S is already pre-aligned, the LCD assembly S is placed at the delivery position. Provided at this delivery position are the guide sections 253G and 253I of the first and second projections 253E and 253F of each positioning frame 253A.

Next, the loader arm 7A is slightly moved down, pulling the LCD assembly S to each positioning frame 253A. The sides of the LCD assembly S contact the guide sections 253G and 253I of the positioning frame 253A. After the LCD assembly S is moved to the positioning frames 253A, the loader arm 7A is moved back from the mount assembly 251, and stands by there.

The receiving mechanism 253 positions the LCD assembly S. More specifically, when the LCD assembly S is mounted on the guide sections 253G and 253I, it falls by its dead weight along the tapered surface of each guide section. Then, the LCD assembly S is supported by support sections 253H of the first projections 253E, which are provided at the front and back of the delivery mechanism 253. At the same time, the LCD assembly S is positioned by a vertical wall, which is continuous to each of the guide sections 253G and 253I.

Upon completion of positioning the LCD assembly S, the mount assembly 251 is moved up until the holder mechanism 254 reaches the delivery mechanism 253. When the mount assembly 251 is further moved up, the first and second projections 253E and 253F are inserted into the first and second insertion grooves 254E and 254F, respectively. The LCD assembly S is thereby mounted on the first and second support sections 254A and 254B of the holder mechanism 254. The projections 253E and 253F are inserted, their entirety, in the grooves 254E and 254F, respectively. The mechanisms 253 and 254 are stopped.

As mentioned above, the LCD assembly S is supported by the first and second support sections 254A and 254B. The first support section 254A is evacuated through each exhaust hole 254D, so that a concave portion 254C is evacuated. Moreover, the LCD assembly S is attracted at two sides to the holder mechanism 254.

Then, the table 25 is aligned with the ball screw 264, etc., in the alignment area 24A (FIG. 1). As described above, the ball screw 264, etc., are used as a lift mechanism. Instead, the positioning frame 253A may be moved up and down by the air cylinder, etc. After the alignment, the table 25 is moved to a test area 23. In the test area 23, pads P are positioned at probes (not shown) by the operator, who sees an image of the pads and the probes. The mount assembly 251 is guided by the guide post 252 to be moved up. The pads P are made to abut on the probes and are electrically contacted the probes, without fail, by application overdrive thereon.

Figure 20:
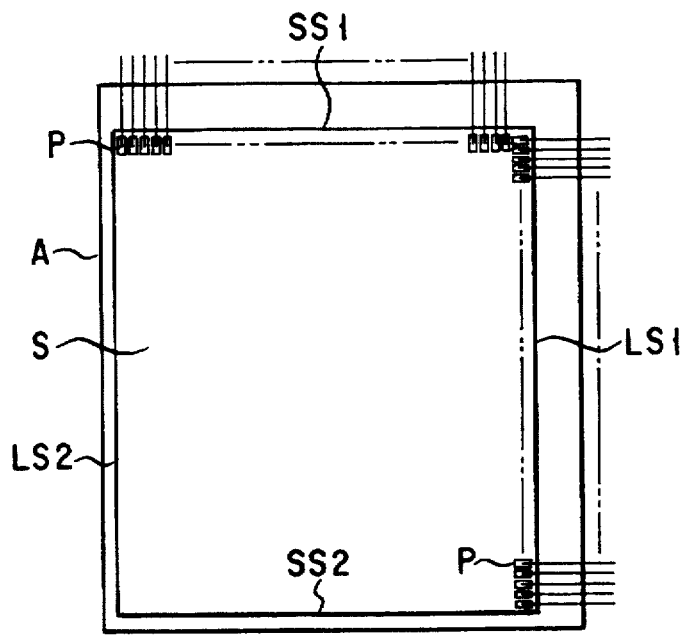
FIG. 20 is a plan view of the LCD assembly mounted on the table, showing the positions of the pads provided on the LCD assembly.

As shown in FIG. 20, in the region area A, the LCD assembly S is positioned as will be explained below.

One short side $SS_2$ and one long side $LS_2$ of the LCD assembly S are set nearest the left edge of the receiving area A. A large margin is provided at the other short side $SS_1$ and the other long side $LS_1$. The margin is about 7 to 8 mm. This specific arrangement is to satisfy the following two conflicting requirements. The first requirement is that a LCD display area be expanded much as possible. The second requirement is that the attract section be expanded as much as possible. If the LCD display area is expanded, the attract section will be narrowed, reducing the attraction so much that the glass substrates will possibly be displaced when they contact the probes. On the other hand, if the attract section is expanded, the rear light-applying is narrowed, inevitably decreasing the test accuracy.

Figure 21:
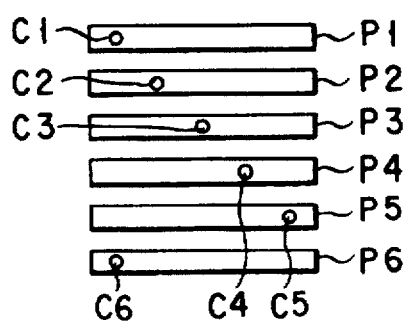
FIG. 21 is an enlarged plan view explaining how the pads are arranged and electrically connected to the electric circuits incorporated in the LCD assembly.

As shown in FIG. 21, the pads P are formed long and thin. The vertical probes (not shown) are electrically connected to the pads $P_1, \ldots, P_6, \ldots P_n$ at points $C_1, \ldots, C_6, \ldots C_n$ which are increasingly displaced, one from another, in a longitudinal direction of the pads. The distance between the probes increases, and no crosstalk of the test signal is generated. The number of the probes ranges from several hundreds to 5000 at their maximum.

Test signals are supplied to the probes, and the light-applying device 255 applies light to the back of the LCD assembly S. The LCD assembly S displays predetermined mark and pattern. The mark and pattern are scanned by the fifth CCD camera 80, which generates image data. The image data is analyzed by a tester T. The quality of pixels of the LCD assembly S can be determined.

During the test, a load is applied onto only two sides of the LCD assembly S mounted on the mount assembly 251 from the probes. The load is an offset load, which is applied to four guide posts 252. Nonetheless, the guide posts 252 are rigid and overcome the offset load. This is because the guide posts 252 contains needle bearings 252D of the siding member 252C, which are in line-contact with the expansion surface 252F of the cylindrical member 252A and with the expansion surface 252G of the rod 252B. Since the LCD assembly S and the mount assembly 251 are not displaced, the pads P are not displaced from the probes, whereby the LCD assembly can be tested with high accuracy. The time required for pre-alignment and fine alignment is about 20 seconds, and the time required for test is 30 to 60 seconds.

In the present invention, the pre-alignment rollers are rotated while contacting the LCD assembly S, and the LCD assembly S can be pre-aligned without damaging the glass substrate and generating particles. Since the pre-alignment roller can easily rotate even if a light LCD assembly S is mounted thereon, the LCD assembly S can be pre-aligned without fail.

Even if the LCD assembly S pre-aligned is displaced a little from the original correct position, the LCD assembly S can be positioned with high accuracy, thanks to the self-alignment of the substrate support section.

Moreover, since the guide mechanism for guiding the table moving vertically has high rigidity, the pads are not displaced from the probes. This makes it possible to test the LCD assembly with high accuracy.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An LCD testing apparatus comprising:
   a table configured to support an LCD assembly and to apply light to the back of the LCD assembly; and
   a transport mechanism configured to take the LCD assembly out from a cassette and transport the LCD assembly onto said table, said transport mechanism comprising,
   an arm configured to hold the LCD assembly,
   a first lift mechanism configured to vertically move the arm, and
   a pre-alignment mechanism configured to receive the LCD assembly and preliminarily align the LCD assembly with the table,
   wherein said pre-alignment mechanism comprises,
   a plurality of support rollers configured to support the LCD assembly in a substantially horizontal position,
   four pairs of positioning rollers located above said support rollers and configured to allow the LCD assembly to fall under the force of gravity onto said support rollers and configured to hold corners of the LCD assembly; and
   a second lift mechanism configured to move said positioning rollers and said support rollers upwards as said first lift mechanism moves said arm downwards.

2. The apparatus according to claim 1, further comprising:
   a positioning member attached to a rear portion of said arm, designed to abut on a front side of the LCD assembly, and configured to push back the LCD assembly when the LCD assembly is removed from the cassette.

3. The apparatus according to claim 1, further comprising:
   an assembly-orienting mechanism configured to move upwards through an opening made in said arm and configured to lift the LCD assembly and orient the LCD assembly in a horizontal plane.

4. The apparatus according to claim 1, wherein said table comprises:
   a transfer mechanism configured to vertically transfer the LCD assembly between said table and said transport mechanism; and
   a holder mechanism configured to receive and hold the LCD assembly transferred by the transfer mechanism;
   wherein said transfer mechanism comprises a support section configured to contact two sides of the LCD assembly and a guide section configured to contact at least two diagonally opposite corners of the LCD assembly and guide the LCD assembly onto said support section.

5. The apparatus according to claim 1, wherein said table further comprises:
   a mount assembly configured to support the LCD assembly;
   a lift mechanism attached to a lower surface of the mount assembly and configured to vertically move the mount assembly; and
   at least three guide mechanisms which surround the lift mechanism, are spaced therefrom at equal distances, and are configured to guide the mount assembly moved by said lift mechanism, each of said guide mechanisms comprising:
   a hollow cylinder,
   a rod inserted in the hollow cylinder, and
   a sliding member interposed between the hollow cylinder and the rod and set in linear contact with the hollow cylinder and the rod.

6. An LCD testing apparatus comprising:
   a table configured to support an LCD assembly and to apply light to the back of the LCD assembly; and
   a transport mechanism configured to remove the LCD assembly from a cassette and transport the LCD assembly onto said table, said table mechanism comprising:
   a transfer mechanism configured to transfer the LCD assembly between said table and said transport mechanism, and
   a holder mechanism configured to receive and hold the LCD assembly transferred by the transfer mechanism;
   wherein said transfer mechanism comprises, a support section configured to contact two sides of the LCD assembly, and
   a guide section configured to contact at least two diagonally opposite corners of the LCD assembly and guide the LCD assembly onto said support section.

7. The apparatus according to claim 6, wherein said holder mechanism comprises:
   grooves in which the support section and guide section of said transfer mechanism are fitted.

8. The apparatus according to claim 6, wherein said guide section comprises:
   a tapered surface inclined to a horizontal plane and treated to be substantially non-reflective.

9. The apparatus according to claim 6, wherein said transport mechanism comprises:
   an arm configured to hold the LCD assembly;
   a first lift mechanism configured to move the arm vertically: and
   a pre-alignment mechanism configured to receive the LCD assembly and preliminarily align the LCD assembly with the table, said pre-alignment mechanism comprising,
   a plurality of support rollers configured to support the LCD assembly in a substantially horizontal position;
   four pairs of positioning rollers located above said support rollers, configured to allow the LCD assembly to fall under the force of gravity onto said support rollers, and configured to hold corners of the LCD assembly; and
   a second lift mechanism configured to move upwards said positioning rollers and said support rollers as said first lift mechanism moves said arm downwards.

10. An LCD testing apparatus comprising:
    a table configured to support an LCD assembly and to apply light to the back of the LCD assembly; and
    a transport mechanism configured to remove the LCD assembly from a cassette and transport the LCD assembly onto said table, said table comprising,
    a mount assembly configured to support the LCD assembly;
    a lift mechanism attached to a lower surface of said mount assembly and configured to move said mount assembly vertically; and
    at least three guide mechanisms surrounding the lift mechanism and spaced therefrom at equal distances and configured to guide the mount assembly moved by said lift mechanism;
    wherein each of said guide mechanisms comprises,
    a hollow cylinder connected at an upper end to said mount assembly and configured to vertically move with said mount assembly,
    a rod inserted in the hollow cylinder, and a sliding member interposed between the hollow cylinder and the rod and set in linear contact with the hollow cylinder and the rod.

11. The apparatus according to claim 10, wherein each of said sliding members comprises:

a plurality of grooves arranged at regular intervals in a circumferential direction and a lengthwise direction; and a plurality of needle bearings, each held in one of the grooves, respectively.

12. The apparatus according to claim 11, wherein each needle bearing comprises:

two circumferential portions which protrude from inner and outer circumferential surfaces of said sliding member and are set in linear contact with an inner circumferential surface of said hollow cylinder and an outer circumferential surface of said rod.

13. The apparatus according to claim 10, wherein said transport mechanism comprises:

an arm for holding the LCD assembly;

a first lift mechanism configured to vertically move the arm; and a pre-alignment mechanism configured to receive the LCD assembly and preliminarily align the LCD assembly with the table, said pre-alignment mechanism comprising, a plurality of support rollers configured to support the LCD assembly in a substantially horizontal position, four pairs of positioning rollers located above said support rollers, configured to allow the LCD assembly to fall under the force of gravity onto said support rollers, and configured to hold corners of the LCD assembly, and a second lift mechanism configured to move upwards said positioning rollers and said support rollers as said first lift mechanism moves said arm downwards.

* * * * *